United States Patent Office 3,314,964
Patented Apr. 18, 1967

3,314,964
TRANS INDOLOMORPHINANS AND PROCESS FOR THEIR PRODUCTION
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed Jan. 16, 1964, Ser. No. 338,028
10 Claims. (Cl. 260—288)

This is a continuation-in-part of application Ser. No. 308,076, filed Sept. 11, 1963.

This invention relates to new and novel heterocyclic compounds and relates more particularly to new and novel trans indolomorphinans, also known as trans indolocyclohexmorphans, having the formula:

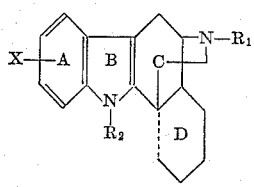

wherein $R_1$ may be lower alkyl of 1 to 6 carbons such as methyl, ethyl, propyl, isopropyl, butyl, isobutyl, n-hexyl and the like, cycloalkyls such as cyclopropyl, cyclobutyl, aralkyl such as phenethyl, substituted aralkyl such as chlorobenzyl, cycloalkylmethyl such as cyclopropylmethyl, and substituted $\beta$-phenethyl, such as p-nitro-$\beta$-phenethyl and p-amino-$\beta$-phenethyl, alkenyl such as dimethylallyl and allyl; $R_2$ may be hydrogen, or lower alkyl such as methyl, ethyl, or propyl; cycloalkylmethyl such as cyclopropylmethyl, X may be hydrogen, lower alkyl such as methyl, ethyl or propyl, halogen such chlorine, fluorine, or bromine, lower alkoxy such as methoxy or ethoxy, or nitro, mercapto or amino.

The symbols $R_1$, $R_2$ and X as used hereinafter have the same meaning as defined.

This invention also includes within its scope a new and novel process for preparing the above compounds as well as the intermediates obtained during the synthesis.

The new and novel compounds of this invention have interesting and significant pharmacological activity and are useful as analgesics, anti-tussives, and anti-inflammatory agents. In addition, they are valuable intermediates in the production of other compounds of the indolomorphinan series.

In the aforesaid copending application, we describe and claim indolomorphinans as a new class of heterocyclic compounds. Upon further experimentation in this field, we have discovered quite surprisingly that by modifying the process described in said copending application, we are able to produce a new class of indolomorphinans which differ from the previously described indolomorphinans in that the C—D ring is trans fused. In other words, the indolomorphinans described in said copending application contain a cis fused C—D ring whereas the compounds of this invention contain a C—D ring system which is trans fused.

Broadly speaking, this modification in the structure of the resulting compounds resides in the use of an N-substituted-cyclohexenylethylamine as the starting material rather than the cyclohexenylethylamine which was employed previously. The instant invention, therefore, stems from the unexpected finding that modifying the reactants in this way will result in the formation of trans indolomorphinans. In the above-depicted structural formula, the use of a dotted line denotes the trans fusion of the C—D rings.

According to this invention, these novel trans indolomorphinans are produced by the following reaction steps.

First, an N-substituted-cyclohexenylethylamine of the formula

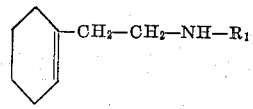

wherein $R_1$ is as defined is treated with either indoleacetic acid or a substituted indoleacetic acid of the formula:

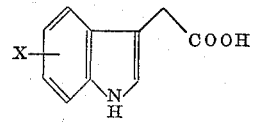

or with an ester of said acids, such as methyl indoleacetate to form an amide of the formula:

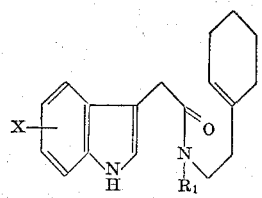

(I)

This reaction is normally effected at a temperature of about 175° to 185° C. for about 40 to 50 hours blanketed under an inert atmosphere such as a stream of nitrogen.

Second, the above amide I is then treated with phosphorous oxychloride at ambient temperature such as 20 to 30° C. to ring-close the amide and to form an iso-quinoline compound of the following structural formula:

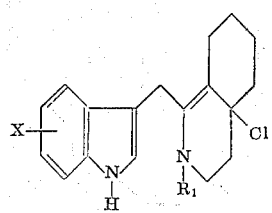

(II)

The third step in this reaction sequence involves treatment of compound II with a reducing agent such as sodium borohydride to form a compound of the formula:

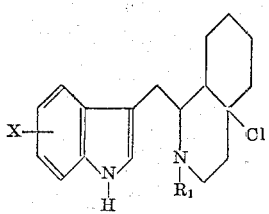

(III)

Compound III is then treated with aqueous alkali metal hydroxide such as sodium hydroxide to form a compound of the formula:

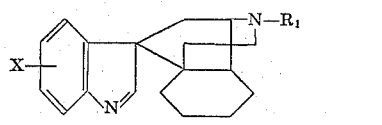

(VI)

Further treatment of compound IV with an alcoholic solution of a mineral acid such as ethanolic hydrochloric acid yields the trans indolomorphinan of this invention. This rearrangement reaction is carried out at the reflux temperature of the solvent for a brief period such as 5 to 10 minutes. Solvents suitable for this reaction are, for example, ethanol, methanol, and the like. Accordingly, the reflux temperature will be from about 80 to 90° C.

To obtain those compounds wherein $R_2$ is lower alkyl, compound V below is alkylated employing alkylating agents such as dimethyl carbonate in the presence of sodium hydride, dimethyl sulfate, and so on.

The foregoing reaction steps may be conveniently illustrated by the following schematic diagram:

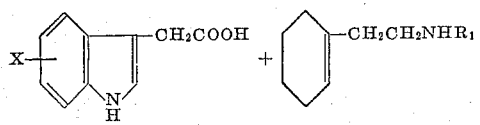

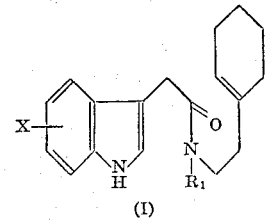
(I)

↓ POCl₃

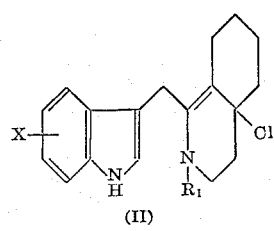
(II)

↓ NaBH₄

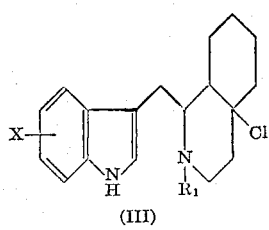
(III)

↓ NaOH

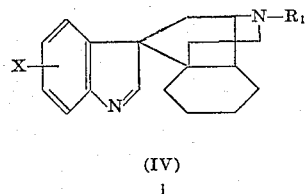
(IV)

↓

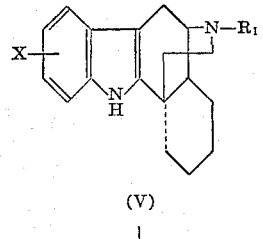
(V)

↓ alkylate

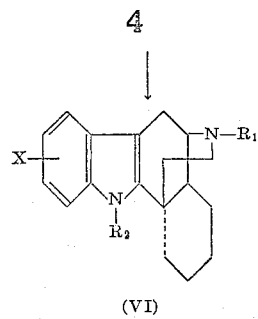
(VI)

The compounds of our invention may be converted into their pharmaceutically acceptable non-toxic acid addition and quaternary ammonium salts by conventional procedures. Exemplary of non-toxic acid addition salts are those formed with acetic, maleic, fumaric, succinic, tartaric, citric, malic, cinnamic, sulfonic, hydrochloric, hydrobromic, sulfuric, phosphoric and nitric acids. The acid addition salts may be prepared in the conventional manner by treating a solution or suspension of the free base in an organic solvent with the desired acid, and then recovering the salts which form by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate.

For therapeutic use, our compounds, either as the free base or in the form of salts, may be combined with conventional pharmaceutical diluents and carriers to form such dosage units as tablets, capsules, suppositories, elixirs, solutions or suspensions.

The following examples are included in order further to illustrate the present invention. All temperatures are given in degrees centigrade.

EXAMPLE 1

*N-[2-(1-cyclohexenyl)ethyl]-N-methyl-indole-3-acetamide*

A. *From indole-3-acetic acid.*—A mixture of 139 g. of N-methyl-cyclohexenylethylamine and 175 g. of indole-3-acetic acid is heated at 175° for 44 hours under a stream of nitrogen. The reaction mixture is dissolved in chloroform; washed with dilute hydrochloric acid, saturated sodium bicarbonate solution, and water. The chloroform solution is dried over sodium sulfate and the solvent removed. Two recrystallizations from benzene gives 97.5 g. (46%) of N-[2-(1-cyclohexenyl) ethyl]-N-methyl-indole-3-acetamide as a crystalline solid, M.P. 124–126°. Further recrystallization from benzene gives an analytical sample, M.P. 123–124°;

$\gamma_{max.}^{Nujol}$: 745, 1622, 3210 cm⁻¹; $\gamma_{max.}^{CHCl_3}$: 1630, 3440 cm⁻¹;

$\lambda_{max.}^{EtOH}$: 220 mμ (37,500), 272 mμ (5,650), 280 mμ (6,000), 289 mμ (5,200)

Analysis for $C_{19}H_{24}N_2O$: Calcd: C, 76.99; H, 8.16; N, 9.45. Found: C, 77.28; H, 8.21; N, 9.57.

B. *From methyl indole-3-acetate.*—A mixture of 5.0 g. of methyl indole-3-acetate and 3.6 g. of N-methylcyclohexenylethylamine is heated at 130°, for 44 hours, in a flask equipped with an ascarite drying tube. Treatment of the reaction mixture as above gives 1.3 g. of N-[2-(1-cyclohexenyl)ethyl]-N-methyl-indole-3-acetamide as a crystalline solid, M.P. 123–125°. This sample is shown to be identical with that obtained in method A by the methods of mixed melting point and infrared analysis.

EXAMPLE 2

*4a-chloro-2,3,4,4a,5,6,7,8-octahydro-1-(indol-3-ylmethyl)-2-methylisoquinoline*

A solution of 10.0 g. of N-[2-(1-cyclohexenyl)ethyl] indole-3-acetamide in 40 ml. of phosphorous oxychloride is allowed to stand for 24 hours. The reaction mixture is poured into ether with stirring. The ether is decanted and the precipitate stirred with 500 ml. of water, at 45°, for 30 minutes. After filtration the solution is made basic with 10% sodium hydroxide solution and extracted with ether. The ether layer is washed with water, dried over sodium sulfate, and the solvent removed. The residue on titration with 50 ml. of methanol gives 2.3 g. (20%) of 4a-chloro-2,3,4,4a,5,6,7,8-octahydro-1-(indol-3-ylmethyl)-2-methylisoquinoline in the form of a crystalline solid. Recrystallization from benzene-Skelly solve B gives an analytical sample, M.P. 128–132°;

$\gamma_{max.}^{Nujol}$: 740, 1655, 3250 cm.$^{-1}$; $\gamma_{max.}^{CHCl_3}$: 1640, 3450 cm.$^{-1}$;

$\lambda_{max.}^{EtOH}$: 217 m$\mu$ (31,000), 279 m$\mu$ (6,200), 288 m$\mu$ (5,400)

Analysis for $C_{19}H_{23}N_2Cl$: Calcd: C, 72.49; H, 7.35; N, 8.90; Cl, 11.26. Found: C, 72.58; H, 7.62; N, 8.64; Cl, 11.34.

EXAMPLE 3

*4a-chlorodecahydro-1-(indol-3-ylmethyl)-2-methylisoquinoline*

A solution of 76.8 g. of N-[2-(1-cyclohexenyl)ethyl]-N-methylindole-3-acetamide in 300 ml. of phosphorous oxychloride is allowed to stand for 20 hours. The reaction mixture is poured into 3 liters of ether while stirring. The ether is decanted and the precipitate washed with 1 liter of ether. The residue is dissolved in 450 ml. of ethanol and neutralized with 280 ml. of 10% sodium hydroxide solution. The pH is adjusted to 3 with 20% hydrochloric acid, and 15 g. of sodium borohydride added over a 40 minute interval while the temperature is held at 20–27°. The pH is readjusted to 3 and an additional 7.5 g. of sodium borohydride added portion-wise. The pH is adjusted to 2; 750 ml. of water added; the mixture made basic with 10% sodium hydroxide solution and extracted with 750, 500 and 500 ml. portions of dichloromethane. The dichloromethane layers are combined, washed with 500 ml. of water, dried over sodium sulfate and concentrated to 150 ml. On standing, there is deposited 40.0 g. (49%) of 4a-chlorodecahydro-1-(indol-3-ylmethyl)-2-methylisoquinoline as a crystalline solid, M.P. 156–158°. Recrystallization from benzene gives an analytical sample; M.P. 157–158°;

$\gamma_{max.}^{Nujol}$: 742, 3100 cm.$^{-1}$; $\gamma_{max.}^{CHCl_3}$: 3440 cm.$^{-1}$; $\lambda_{max.}^{EtOH}$: 222 m$\mu$ (31,900), 275 m$\mu$ (shoulder 5,000); 282 m$\mu$ (4,800)

Analysis for $C_{19}H_{25}N_2Cl$: Calcd: C, 72.03; H, 7.95; N, 8.84; Cl, 11.18. Found: C, 71.73; H, 8.04; N, 8.56; Cl, 11.29.

*4,5,6,7-tetrahydro-10-methylspiro[[3aH-3,7a]imino-ethanoindan-1,3-indole]*

A mixture of 3.00 g. of 4a-chlorodecahydro-1-(indol-3-ylmethyl)-2-methylisoquinoline, 2.25 g. of potassium hydroxide, and 22.5 ml. of methanol is refluxed for 20 hours. The reaction mixture is poured into water and extracted with ether. The ether layer is washed with water, dried over sodium sulfate, and the solvent removed. There remained 2.4 g. (90%) of an oil which is chromatographed on alumina. Elution with 20% benzene in ether gives 0.30 g. (10%) of 4,5,6,7-tetrahydro-10-methylspiro[[3aH-3,7a]imino-ethanoindan-1,3'-indole] as a solid, M.P. 78–88°. Recrystallization from Skellysolve B (n-hexane) gives an analytical sample of isomer A., M.P. 100–101°;

$\gamma_{max.}^{Nujol}$: 760, 1547; $\gamma_{max.}^{CHCl_3}$: 1548 cm.$^{-1}$ $\lambda_{max.}^{EtOH}$: 220 m$\mu$ (20,800), 227 m$\mu$ (shoulder 16,000), 262 m$\mu$ (4,100)

Analysis for $C_{19}H_{24}N_2$: Calcd: C, 81.38; H, 8.63; N, 9.99. Found: C, 31.38; H, 8.67; N, 10.14.

EXAMPLE 5

*Trans-2-methylcyclohex[j]indolo[2,3-f]morphan hydrochloride*

A solution of crude 4,5,6,7-tetrahydro-10-methylspiro[[3aH - 3,7a]imino - ethanoindan-1,3'-indole](prepared from 36 g. of 4a-chlorodecahydro-1-(indol-3-ylmethyl)-2-methylisoquinoline as above) in 210 ml. of a 5% solution of hydrogen chloride in ethanol is refluxed for 5 minutes. On standing there is deposited 24.3 g. (68%) of trans - 2-methylcyclohex[j]indolo[2,3-f]morphan hydrochloride as a tan crystalline solid, M.P. 340° dec. Recrystallization from ethanol gives an analytical sample, M.P. 335° dec.;

$\gamma_{max.}^{KBr}$: 736, 742, 3150, 3700, 3800 cm.$^{-1}$; $\lambda_{max.}^{EtOH}$: 224 m$\mu$ (36,000), 272 m$\mu$ (7,100), 280 m$\mu$ (7,550), 289 m$\mu$ (6,300)

Analysis for $C_{19}H_{25}N_2Cl$: Calcd: C, 72.02; H, 7.95; N, 8.84. Found: C, 71.81; H, 8.20; N, 9.09.

The free base is obtained by stirring the hydrochloride with a mixture of 300 ml. of saturated sodium bicarbonate solution and 300 ml. of chloroform. The chloroform layer is dried over sodium sulfate and the solvent removed. Recrystallization from Skellysolve B gives a crystalline solid, M.P. 137–138°;

$\gamma_{max.}^{Nujol}$: 732, 740, 3130 cm.$^{-1}$; $\gamma_{max.}^{CHCl_3}$: 3450 cm.$^{-1}$; $\lambda_{max.}^{EtOH}$: 228 m$\mu$ (35,800), 274 m$\mu$ (shoulder 7,000), 282 m$\mu$ (7,600), 290 m$\mu$ (6,800)

Analysis for $C_{19}H_{24}N_2$: Calcd: C, 81.38; H, 8.63; N, 9.99. Found: C, 81.15; H, 8.67; N, 10.03.

EXAMPLE 6

*Trans-2,6-dimethyl cyclohex[j]indolo[2,3-f]morphan*

A mixture of 2.0 g. of trans-2-methylcyclohex[j]indolo[2,3-f]morphan, 2.0 g. of a 55% sodium hydride dispersion in mineral oil, 20 ml. of dimethyl carbonate, and 300 ml. of tetrahydrofuran is refluxed for 18 hours. The reaction mixture is poured into one liter of cold water, made acidic with 20% hydrochloric acid and extracted twice with two 250 ml. portions of ether. The ether layers are discarded. The aqueous layer is made basic with 10% sodium hydroxide solution and extracted with two 250 ml. portions of ether. The ether layers are combined, washed with water, dried over sodium sulfate, and the solvent removed. There remained 2.0 g. (97%) of trans-2,6-dimethylcyclohex[j]indolo[2,3-f]morphan in the form of an oil.

The corresponding hydrobromide formed in ether and crystallized from ethanol-ethyl acetate as a crystalline solid, M.P. 235–236°;

$\gamma_{max.}^{Nujol}$: 742, 2600 cm.$^{-1}$; $\lambda_{max.}^{EtOH}$: 227 m$\mu$ (39,300), 284 m$\mu$ (7,500), 291 m$\mu$ (7,100)

Analysis for $C_{20}H_{27}N_2Br$: Calcd: C, 64.00; H, 7.28; N, 7.46; Br, 21.29. Found: C, 63.92; H, 7.28; N, 7.69; Br, 21.33.

It is to be understood that the foregoing detailed description is given merely by way of illustration and that many variations may be made therein without departing from the spirit of our invention.

Having described our invention, what we desire to secure by Letters Patent is:

1. A compound selected from the group consisting of those having the formula:

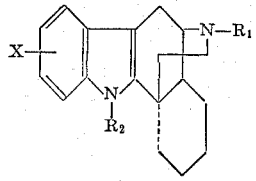

wherein $R_1$ is a member of the group consisting of lower alkyl of 1 to 6 carbons, cycloalkylmethyl, aralkyl, alkenyl, $R_2$ is a member of the group consisting of hydrogen and lower alkyl and X is a member of the group consisting of hydrogen, lower alkyl, halogen, lower alkoxy, nitro, and amino, and the non-toxic pharmaceutically acceptable acid addition salts thereof.

2. Trans-2-methylcyclohex[j]indolo[2,3-f]morphan.

3. Trans - 2,6 - dimethyl cyclohex[j]indolo[2,3 - f]morphan.

4. A compound of the formula:

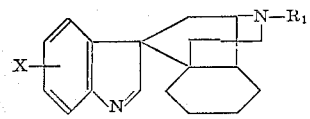

wherein $R_1$ is a member of the group consisting of lower alkyl of 1 to 6 carbons, cycloalkylmethyl, aralkyl, alkenyl and X is a member of the group consisting of hydrogen, lower alkyl, halogen, lower alkoxy, nitro, and amino.

5. 4,5,6,7 - tetrahydro - 10 - methylspiro[[3aH-3,7a] imino-ethanoindan-1,3-indole].

6. A compound of the formula:

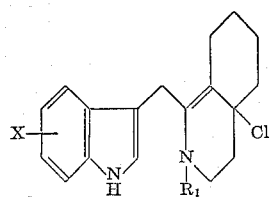

wherein $R_1$ is a member of the group consisting of lower alkyl of 1 to 6 carbons, cycloalkylmethyl, aralkyl, alkenyl, and X is a member of the group consisting of hydrogen, lower alkyl, halogen, lower alkoxy, nitro, and amino.

7. 4a - chlorooctahydro - 1 - (indol - 3 - ylmethyl) - 2-methylisoquinoline.

8. A compound of the formula:

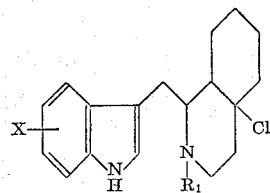

wherein $R_1$ is a member of the group consisting of lower alkyl of 1 to 6 carbons, cycloalkylmethyl, aralkyl, alkenyl and X is a member of the group consisting of hydrogen, lower alkyl, halogen, lower alkoxy, nitro, and amino.

9. 4a - chlorodecahydro - 1 - (indol - 3 - ylmethyl) - 2-methylisoquinoline.

10. Process for the production of the compound of claim 1 wherein $R_2$ is hydrogen which comprises contacting a compound of the formula:

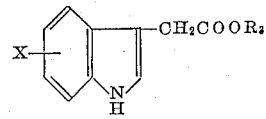

wherein $R_3$ is lower alkyl or hydrogen with a compound of the formula:

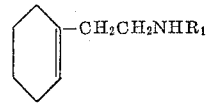

at a temperature of about 175 to 185° C. for about 40 to 50 hours blanketed under an inert atmosphere to form an intermediate amide of the formula:

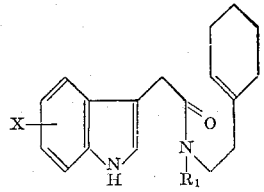

contacting said amide with phosphorous oxychloride at a temperature of about 20 to 30° C. to form an isoquinoline compound of the formula:

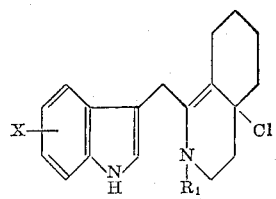

contacting said isoquinoline with a reducing agent to form a compound of the formula:

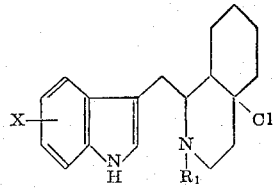

followed by contacting the reduced compound with an aqueous solution of alkali metal hydroxide to form a spiro compound of the formula:

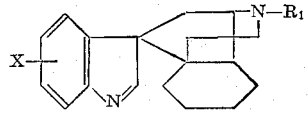

and contacting said spiro compound with an alcoholic solution of a mineral acid at a temperature of about 80 to 90° C. for about 5 to 10 minutes.

References Cited by the Examiner
UNITED STATES PATENTS
3,153,043   10/1964   Weisbach _____ 260—288

ALEX MAZEL, *Primary Examiner.*

DONALD G. DAUS, *Assistant Examiner.*